United States Patent [19]
Edenfield et al.

[11] Patent Number: 5,185,694
[45] Date of Patent: Feb. 9, 1993

[54] DATA PROCESSING SYSTEM UTILIZES BLOCK MOVE INSTRUCTION FOR BURST TRANSFERRING BLOCKS OF DATA ENTRIES WHERE WIDTH OF DATA BLOCKS VARIES

[75] Inventors: Robin W. Edenfield; Ralph McGarity; Russell Reininger; William B. Ledbetter, Jr.; Van B. Shahan, all of Austin, Tex.

[73] Assignee: Motorola, Inc., Schaumburg, Ill.

[21] Appl. No.: 371,343

[22] Filed: Jun. 26, 1989

[51] Int. Cl.⁵ .............................. G06F 13/28
[52] U.S. Cl. ...................... 395/425; 364/243.41; 364/238.4; 364/260; 364/240; 364/240.2; 364/240.3; 364/242.3; 364/964.6; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,533,995 | 8/1985 | Christian et al. | 364/200 |
| 4,564,899 | 1/1986 | Holly et al. | 364/200 |
| 4,802,085 | 1/1989 | Levy et al. | 364/200 |
| 4,811,208 | 3/1989 | Myers et al. | 364/200 |
| 4,910,656 | 3/1990 | Scales, III et al. | 364/200 |
| 4,912,631 | 3/1990 | Lloyd | 364/200 |
| 4,926,323 | 5/1990 | Baror et al. | 364/200 |
| 4,933,835 | 6/1990 | Sachs et al. | 364/200 |
| 4,958,351 | 9/1990 | Flord et al. | 371/40.1 |

Primary Examiner—Thomas C. Lee
Assistant Examiner—Mehmet Geckil
Attorney, Agent, or Firm—Charlotte B. Whitaker

[57] ABSTRACT

A block MOVE instruction allows a programmer to issue an instruction to a loosely coupled system bus controller, thereby facilitating the execution of a memory to memory move of multiple data entries, utilizing a burst mode transfer onto the system bus for both reads and writes. The instruction allows the programmer to fully utilize the maximum bus bandwidth of the system bus for memory to memory transfers of data (e.g. DMA, block moves, memory page initialization) and transfers of instructions/data to detached coprocessors.

15 Claims, 3 Drawing Sheets

DATA PROCESSING SYSTEM UTILIZES BLOCK MOVE INSTRUCTION FOR BURST TRANSFERRING BLOCKS OF DATA ENTRIES WHERE WIDTH OF DATA BLOCKS VARIES

FIELD OF THE INVENTION

This invention relates, in general, to a data processor capable of executing, by means of a single instruction, a memory to memory move of a block of data utilizing a "burst" transfer onto the system bus for both reads and writes. More particularly, this invention relates to an instruction, for loosely coupled systems, which supports the natural data type of the system bus, thereby allowing a systems programmer to issue a MOVE instruction for a data type significantly larger than the natural data type for the CPU.

BACKGROUND OF THE INVENTION

Today's high performance microprocessors require large, high speed data transfer capability between the central processing unit (CPU) and external memory, and peripheral devices. These high performance microprocessors operate in an environment that imposes constraints, such as transfer size and transfer protocol, which limit the overall system performance. Consequently, modern microprocessors uses block transfers (e.g. burst transfers) to partially offset bus bandwidth limitations. These block transfers reduce the ratio of transfer protocol to transfer data, and utilize the maximum bus width for each data transfer.

In the prior art, microprocessors use automatic burst transfers only under special conditions which require movement of data types larger than the maximum data size (e.g. load/unload of a cache line containing multiple processor data words). Since the use of burst transfers is limited to these special cases, other types of block movements of data which are under program control (e.g. DMA, block moves, memory page initialization, and transferring instructions/data to detached coprocessors) can not achieve maximum utilization of the system bus, and system performance is degraded.

SUMMARY OF THE INVENTION

Accordingly, it is an object of the present invention to provide a MOVE instruction which supports the "burst" mode transfer of data, onto the system bus, under programmer control.

Another object of the present invention is to provide a MOVE instruction which allows a programmer to utilize a set of wide registers in a loosely coupled system bus controller to execute a memory to memory, or cache to memory move of a quantity of data greater in size than the natural data type of the CPU.

These and other objects of the present invention are achieved in a data processing system having a first memory and a second memory, a data processor comprising: an instruction execution unit for executing each of a plurality of instructions, for providing a plurality of control signals, and for providing a plurality of operand addresses; a system communications bus; and a first logic portion, coupled to the instruction execution unit and the system communications bus, for responding to a articular one of the plurality of instructions provided by a programmer, by retrieving a predetermined block of data entries, corresponding to a first operand address, from a first memory location, in response to a read block request from the execution unit, and transferring the predetermined block of data entries to a second memory location, corresponding to a second operand address, in response to a write block request from the instruction execution unit, by initiating a burst mode transfer of the predetermined block of data entries received from the first memory location, to the second memory location, via the system communications bus.

DETAILED DESCRIPTION OF THE INVENTION

Figure 1:
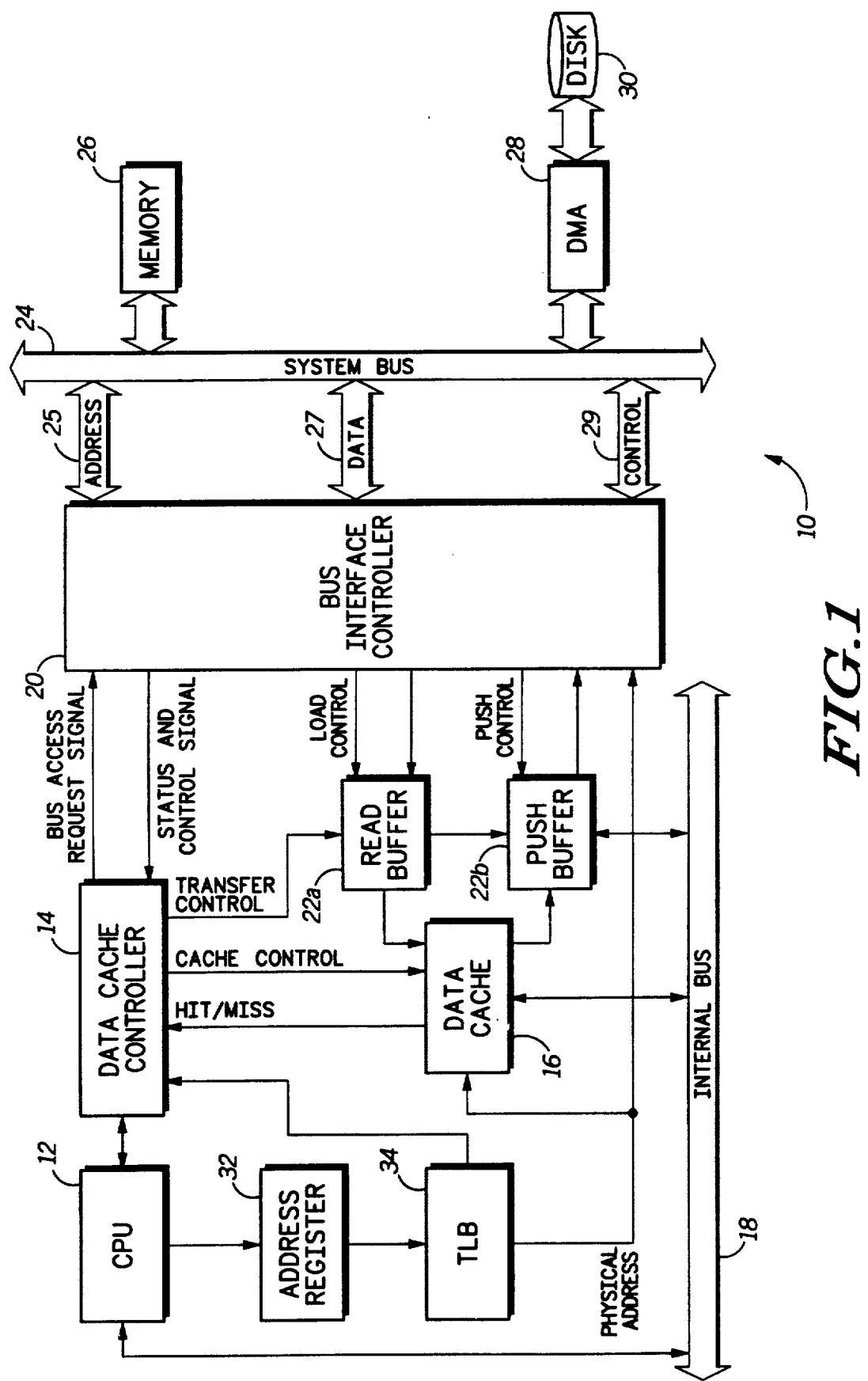
FIG. 1 is a block diagram illustrating an integrated circuit data processing system for implementing the present invention.

Shown in FIG. 1 is a block diagram of a preferred embodiment of a data processing system 10 for implementing the present invention, comprising a CPU 12, a data-cache controller 14, a data cache 16, an internal bus 18, a bus interface controller 20, buffers 22, a system bus 24, a main memory 26, a DMA unit 28, and a disk 30, and an address register 32. Data processing system 10 illustrates a typical uni-processor system, utilizing a single cache designed to support the present invention. In the preferred embodiment, the the internal bus 18 is n bytes wide, where n bytes is the width of the largest natural data type of CPU 12 (i.e. 4 bytes), and the system bus 24 is m bytes wide, where m bytes is the width of a single line of data cache 16 (i.e. 16 bytes). In the illustrated form, CPU 12 is a first internal functional unit having a conventional execution unit for executing a predetermined set of instructions. Data-cache controller 14 is a second internal functional unit which receives control signals from bus interface controller 20, and CPU 12, and manages data transfers between the data cache 16, the CPU 12, and the bus interface controller 20. Data cache 16 is a third functional unit coupled to the data cache controller 14, buffers 22, and the internal bus 18. Data cache 16 contains the appropriate logic necessary to read, write, update, invalidate, and flush the cache. In the preferred embodiment, the three internal functional units operate concurrently to provide the maximum sustained performance.

The MOVE block instruction allows the programmer to take advantage of the line nature of the data cache 16, and the burst capability of the system bus 24. Upon encountering the MOVE block instruction, CPU 12 requests the data cache controller 14 to perform a block read of data from a read address, followed by a block write of the same data to a write address. The data cache controller 14 places the data from the read address in push buffer 22b, in response to receiving a read block request from CPU 12. The data loaded into the push buffer 22b may come from the data cache 16, or from the system bus 24, via the read buffer 22a. In the latter case, the read buffer 22a is loaded by a burst read performed by the bus interface controller 20. The data cache controller 14 sends the data in push buffer 22b to the bus interface controller 20, along with the write address, provided by CPU 12, in response to a write block request. The bus interface controller 20 transfers the data, to main memory 26, corresponding to the write addresses using a burst write transfer.

In operation, CPU 12 executes the MOVE block instruction in the following manner. CPU 12 sends a read block request to the data controller 14, and concurrently sends the read address to the address register 32. In the preferred embodiment, data cache 16 is a physical cache, therefore, the read address will be translated by a translation lookaside buffer (TLB) 34 to generate a corresponding physical address. TLB 34 translates a predetermined number of the upper address bits of the operand address into a physical address, and concurrently transfers the physical address to the data cache controller 14 and the bus interface controller 20. Data cache 16 also receives the physical address generated by TLB 34, and compares the physical address with a set of tag addresses stored in the data cache 16.

In the case where the comparison results in an address match, a cache "hit" occurs, causing data cache 16 to send a HIT signal to the data cache controller 14. If no entry in data cache 16 matches the read address, then a cache "miss" occurs, causing the data cache 16 to send a MISS signal (which is the complement of the HIT signal), to the data cache controller 14. The receipt of the HIT or MISS signal by data cache controller 14 causes one of four events to occur. Event 1 occurs when the MISS signal is received. Event 2 occurs when the HIT signal is received and the read address is cacheable, indicating that the data may be read out of data cache 16. Event 3 occurs when the HIT signal is received, the read address is cache inhibited, and consistent with main memory 26 (VALID). Event 4 occurs when the HIT signal is received, the read address is cache inhibited, and the cache data corresponding to the read address is inconsistent with main memory 26 (DIRTY).

Figure 2A:
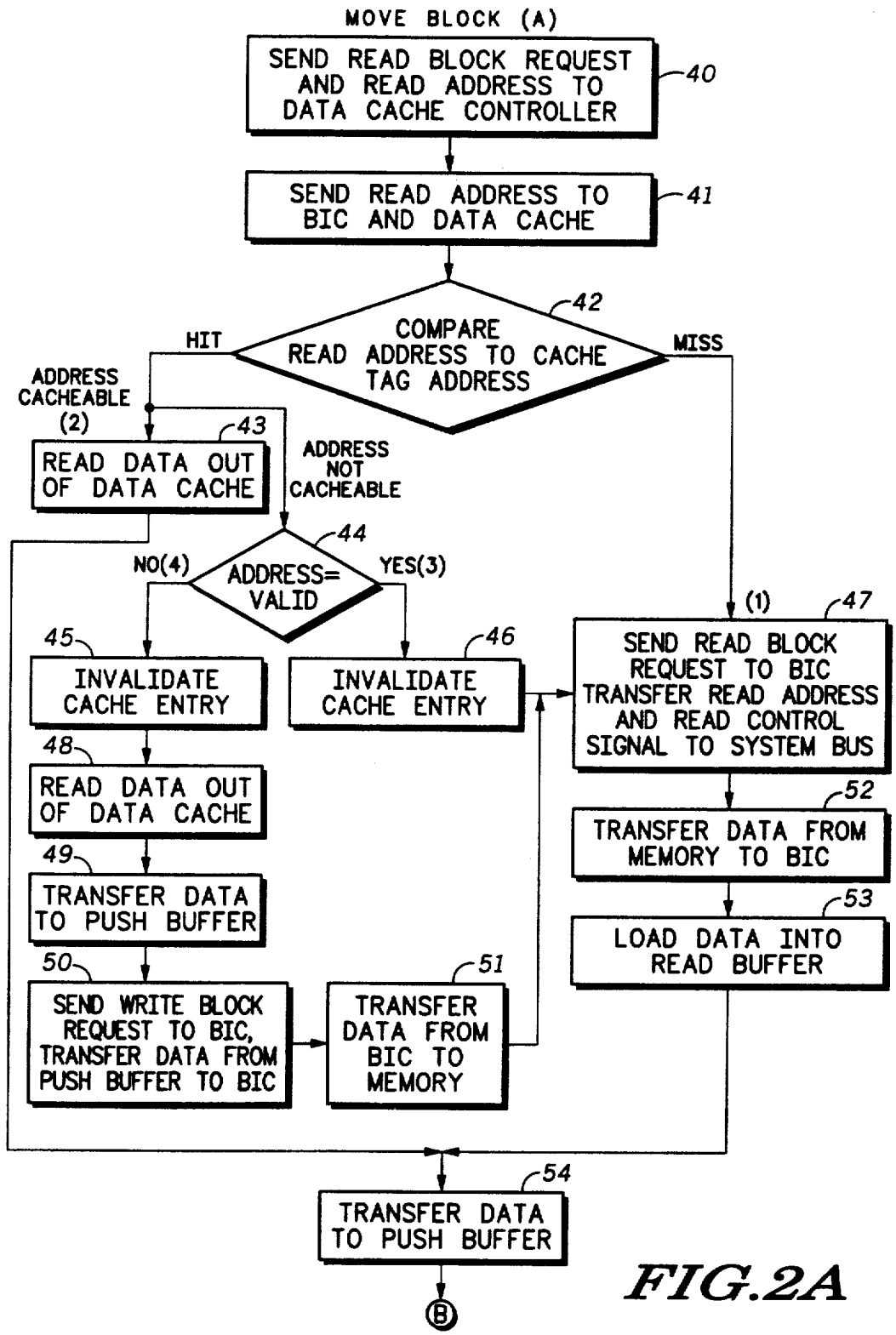
FIGS. 2A and 2B are flow diagrams for performing the MOVE block instruction according to a preferred embodiment of the invention.
Figure 2B:
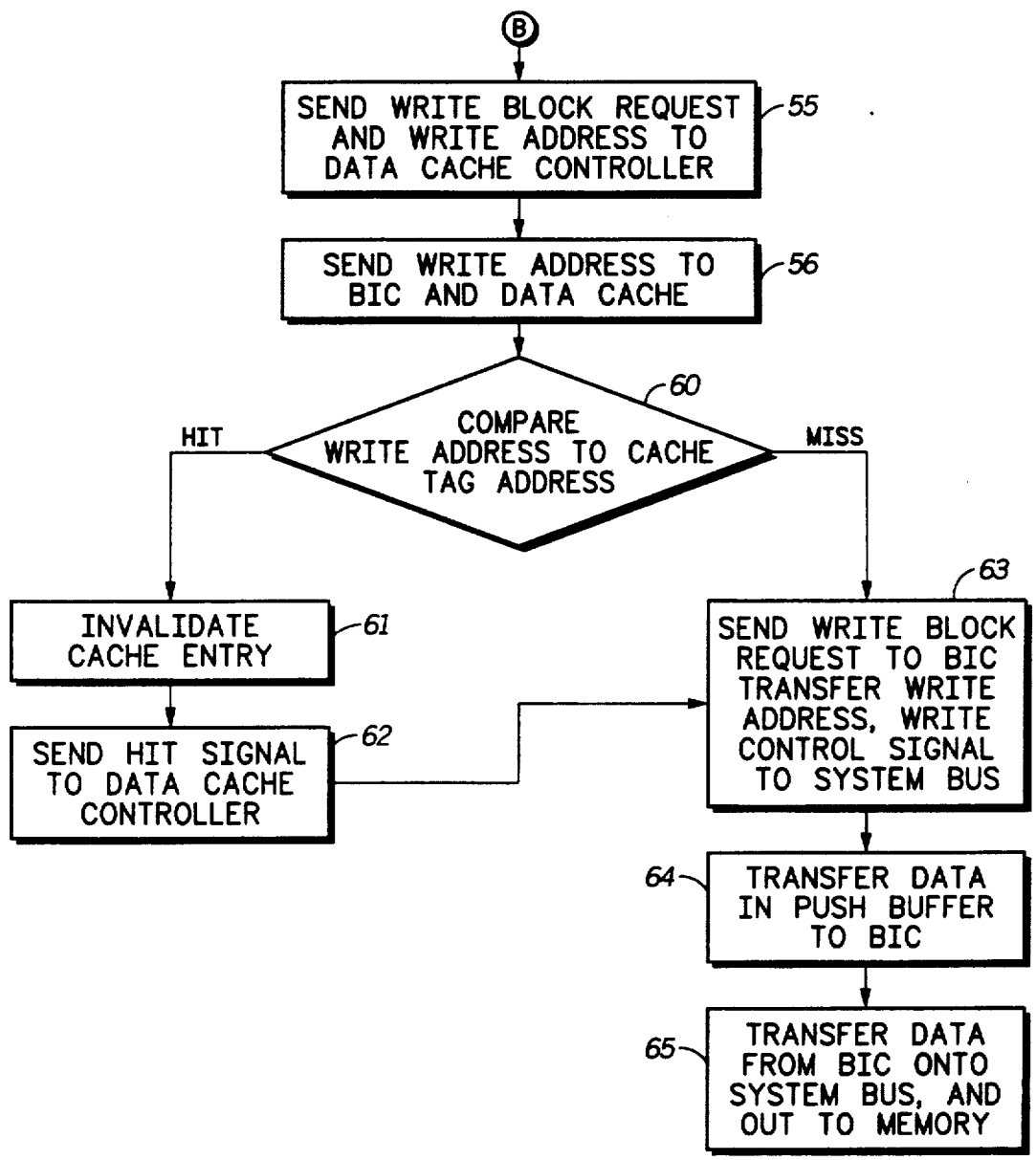

FIGS. 2A and 2B illustrate via steps 40-65 a flow diagram for performing the MOVE block instruction according to a preferred embodiment of the invention. The numbers provided in parenthesis correspond to each of the four events indicated above. Event 1 occurs when the data cache 16 sends the MISS signal to data cache controller 14. In response to receiving the MISS signal, data cache controller 14 sends a BUS ACCESS REQUEST (BAR) signal to the bus interface controller 20, thereby requesting a block read. The read block request corresponds to the read address sent to the bus interface controller 20 by the TLB 34. In response to the BAR signal, the bus interface controller 20 transfers the read address to the system bus 24, via address bus 25, and indicates a burst read transfer using the memory control (CONTROL) signals. In the preferred embodiment, the control signals are transferred onto the system bus 24, via a control bus 29. Upon receiving the read address, and burst read CONTROL signals, main memory 26 transfers the requested data onto the system bus 24 in predetermined data portions, corresponding to the data width. The bus interface controller 20 receives each data portion, via data bus 27, and transfers the data into the read buffer 22a. The bus interface controller 20 indicates the completion of the burst transfer, by means of a STATUS signal sent to the data cache controller 14. The data cache controller 14 then transfers the data from the read buffer 22a to the push buffer 22b, by means of a TRANSFER CONTROL signal.

Event 2 occurs when the data cache 16 sends the HIT signal to the data cache controller 14, and the read address is considered cacheable. The data cache controller 14 reads the entire block of data out of data cache 16, and transfers the data to the push buffer 22b by means of the CACHE CONTROL signal.

Event 3 occurs when the data cache 16 sends the HIT signal to the data cache controller 14, the read address is not cacheable, and the data in the data cache 16 is consistent with main memory 26 (e.g. VALID). The data cache controller 14 invalidates the cache entry by means of a control signal, and proceeds to retrieve the block of data from main memory 26, as described in Event 1.

Event 4 occurs when the HIT signal is received by the data cache controller 14 from the data cache 16, the read address is not cacheable, and the data in the data cache 16, corresponding to the read address, is inconsistent with main memory 26 (e.g. DIRTY). The data cache controller 14 invalidates the entry in the data cache 16, reads the entire cache block of data out of the data cache 16, and transfers the data to push buffer 22b by means of the CACHE CONTROL signal. The data cache controller 14 sends a block write (push) request to the bus interface controller 20, indicating that the dirty data is now stored in push buffer 22b. Upon acceptance of the push request, the bus interface controller 20 sends the PUSH CONTROL signal to push buffer 22b, and thereby transfers the dirty data stored in push buffer 22b into an internal register (not shown) in the bus interface controller 20. The dirty data is written back to the main memory 26. The bus interface controller 20 sends a STATUS signal to the data cache controller 14, thereby indicating the acceptance of the push request. Upon receiving the STATUS signal from the bus interface controller 20, data cache controller 14 begins the read cycle again, and Event 1 occurs.

Regardless of which event occurs on the block read request from the CPU 12, once the push buffer 22b is loaded with the read data, the data cache controller 14 is ready to accept the write block request from the CPU 12. Upon receipt of the write block request and the write address, data cache controller 14 concurrently sends the write address (possibly translated by the TLB 34) to the bus interface controller 20, and the data cache 16. The data cache 16 compares the write address against tag address stored in the data cache 16. In the case where the comparison results in an address match, a cache "hit" occurs, causing data cache 16 to invalidate the matching cache entry, and to send the HIT signal to data cache controller 14. If no cache entry matches the write address, then a cache "miss" occurs, causing the data cache 16 to send a MISS signal to the data cache controller 14. Since there is no matching cache entry, requiring invalidation, the data cache 16 takes no further action.

In either case (cache "hit" or "miss"), data cache controller 14 sends a BAR signal to the bus interface controller 20, thereby requesting the block write. Upon acceptance of the write block request, the bus interface controller 20 transfers the write address to the system bus 24, along with write block control signals for a write burst transfer. Furthermore, the bus interface controller 20 sends a PUSH CONTROL signal to push buffer 22b, thereby transferring the data from the push buffer 22b to the system bus 24 (via the bus interface controller 20), in predetermined portions corresponding to the maximum bus width. The rate of data transfer is controlled by the rate of acceptance of each portion of the data by the main memory 26. The main memory 26 indicates, via status signals, its acceptance of each portion of data, therefore, the transfer continues until the entire push buffer 22b has been transferred to main memory 26, and the burst transfer is complete. The bus interface controller 20 notifies the data cache controller 14 of the completion of the data transfer to main memory 26 by means of a STATUS signal. The MOVE block instruction is now complete, and the data cache controller 14 is ready to accept new requests from the CPU 12.

While the present invention has been described in a preferred embodiment, it will be apparent to those skilled in the art that the disclosed invention may be modified in numerous ways and may assume many embodiments other than that specifically set out and described above. For example, the data cache 16 may be a logical cache, in which case the address translation performed by TLB 34 is no longer necessary. Accordingly, in the case where data cache 16 is a logical cache, the address register 32 will provide the read address directly to the data cache controller 14 and the bus interface controller 20. The BLOCK MOVE instruction may be utilized to support burst writes of the data to direct memory access devices (DMA) 28, or detached coprocessors. The size of the block transferred may be modified depending upon cache line size and bus protocol. Moreover, the change in block size may be encoded in the instruction itself. The BLOCK MOVE instruction may also be utilized to support burst writes of the data contents of multiple registers. This may be accomplished by designating registers in CPU 12 as the source of the read data, and transferring those registers to push buffer 22b, via the internal bus 18, thereby effectively performing a move-multiple-register instruction.

We claim:

1. In a data processing system, having a first memory and a second memory coupled to a system communications bus m bytes wide, where m bytes is a width of a single line of said first memory, a data processor for executing a block move instruction for a predetermined block of data entries, comprising:
instruction execution means, coupled to said first memory, for executing each of a plurality of instructions, for providing a plurality of control signals, and for providing a plurality of operand addresses;
an internal communications bus, coupled to said first memory and said instruction execution means, said internal communications bus being n bytes wide, where n bytes is a width of a largest natural data type of said instruction execution means, and n is an integer smaller than m; and
first means, coupled to said instruction execution means and said system communications bus, for responding to said block move instruction by initiating a burst read transfer to retrieve a block of data entries comprising m bytes, from read address, and by initiating a burst write transfer of said block of data entries to a write address in said second memory, wherein said first means controls the different number of bytes of said block of data entries being burst transferred onto said system communications bus in response to said block move instruction being externally provided.

2. The data processor of claim 1 wherein said first means comprises:
bus controller means, coupled to said system communications bus, for retrieving said predetermined block of data entries from said read address, and for initiating said burst write transfer of said block of data entries to said write address, via said system communications bus, in response to said write block request;
storage means, coupled to said bus controller means for temporarily storing said predetermined block of data entries, and for transferring said predetermined block of data entries to said bus controller means, in response to a first control signal, provided by said bus controller means; and
memory controller means, coupled to said instruction execution means, said bus controller means, and said storage means, for receiving said read block request from said instruction execution means, and for transferring said predetermined block of data entries to said storage means, in response thereto, for receiving said write block request from said instruction execution means, and for transferring said write address to said bus controller means, in response thereto, said bus controller means initiating said burst write transfer of said predetermined block of data entries from said storage means to said write address, via said system communications bus.

3. The data processor of claim 2 wherein said bus controller means comprises a plurality of registers for receiving said block of data entries from said storage means, said plurality of registers being accessible to said human programmer, via said block move instruction.

4. The data processor of claim 3 further comprising address register means for receiving said plurality of operand addresses from said instruction execution means and for providing said read and write addresses to said memory controller means.

5. A data processor, for executing a block move instruction received from a human programmer by transferring an m byte wide data entry from a first memory location to a second memory location, via a system communications bus that is m bytes wide, wherein m is an integer and said m byte wide data entry is larger than a maximum natural data type for said data processor, said data processor comprising:
instruction execution means, for executing each of a plurality of instructions, including said block move instruction, and for providing a plurality of control signals and a plurality of operand addresses required to execute said instructions; said instruction execution means executing said block move instruction under control of said human programmer; and first means, coupled to said instruction execution means and said system communications bus, for responding to said said block move instruction by retrieving said m byte wide data entry from said first memory location, in response to a read block request from said instruction execution means, and by transferring said m byte wide data entry to said second memory location, via said system communications bus, in response to a write block request from said instruction execution means, wherein said first means controls the different number of bytes of said block of data entries being burst transferred onto said system communications bus in response to said block move instruction being externally provided.

6. The data processor claim 5 wherein said first means performs a memory to memory move of said m byte wide data entry from said first memory location to said second memory location, by executing a burst write transfer of said m byte data entry onto said system communications bus.

7. The data processor of claim 6 wherein said first means comprises:
- bus controller means, coupled to said system communications bus, for retrieving said m byte wide data entry from a read address comprising said first memory location, provided by said instruction execution means, and for initiating said burst write transfer of said m byte wide data entry to a write address, via said system communications bus, said write address comprising said second memory location;
- storage means, coupled to said bus controller means, for temporarily storing said m byte wide data entry, and for transferring said m byte wide data entry to said bus controller means, in response to a first control signal provided by said bus controller means; and
- memory controller means, coupled to said instruction execution means, said bus controller means, and said storage means, for receiving said read block request from said instruction execution means, and for transferring said m byte wide data entry retrieved from said first memory location to said storage means, in response thereto, for receiving said write block request from said instruction execution means, and for transferring said write address to said bus controller means, said memory controller means requesting said bus controller means to initiate a said burst write transfer of said byte wide data entry from said storage means to said second memory location bus controller means, via said system communications bus.

8. The data processor of claim 7 wherein said bus controller means comprises a plurality of registers for receiving said m byte wide data entry from said storage means, said plurality of registers being accessible by said human programmer, via said block move instruction.

9. The data processor of claim 8 further comprising address register means for receiving said plurality of operand addresses from said instruction execution means and for providing said read and write addresses to said bus controller means and said memory controller means.

10. The data processor of claim 9 wherein said memory controller means provides a bus request signal to said bus controller means, thereby notifying said bus controller that said m byte wide data entry, retrieved from said first memory location, is stored in said storage means and ready for said burst write transfer to said second memory location.

11. The data processor claim 5 wherein said first means transfers said m byte wide data entry to said second memory location, by executing a non-burst mode data transfer of said m byte data entry onto said system communications bus, said first means allowing said non-burst write transfer of said m byte wide data entry under control by said human programmer.

12. The data processor of claim 11 wherein said first means comprises:
- bus controller means, coupled to said system communications bus, for retrieving said m byte wide data entry from a read address provided by said instruction execution means, and for initiating said burst mode data transfer of said m byte wide data entry to a write address provided by said instruction execution means, via said system communications bus;
- storage means, coupled to said bus controller means, for temporarily storing said m byte wide data entry, and for transferring said m byte wide data entry to said bus controller means, in response to a first control signal provided by said bus controller means; and
- memory controller means, coupled to said instruction execution means, said bus controller means, and said storage means, for receiving said read block request from said instruction execution means, and for transferring said m byte wide data entry from said first memory location to said storage means, in response thereto, for receiving said write block request from said instruction execution means, and for transferring said write address to said bus controller means, in response thereto, said memory controller means thereby requesting said bus controller means to initiate a transfer of said m byte wide data entry from said storage means to said second memory location, via said system communications bus.

13. The data processor of claim 12 wherein said bus controller means comprises a plurality of registers for receiving said m byte wide data entry from said storage means, said plurality of registers being accessible by said human programmer, via said block move instruction.

14. The data processor of claim 13 further comprising address register means for receiving said plurality of operand addresses from said instruction execution means and for providing said read and write addresses to said bus controller means and said memory controller means.

15. The data processor of claim 14 wherein said memory controller means provides a bus request signal to said bus controller means, thereby notifying said bus controller that said m byte wide data entry, retrieved from said first memory location, is stored in said storage means and ready for transfer to said second memory location.

* * * * *

UNITED STATES PATENT AND TRADEMARK OFFICE
CERTIFICATE OF CORRECTION

PATENT NO. : 5,185,694

DATED : February 9, 1993

INVENTOR(S) : Robin W. Edenfield, et al.

It is certified that error appears in the above-identified patent and that said Letters Patent is hereby corrected as shown below:

Column 5, line 54, after "from", insert --a--.

Column 6, line 50, after "to", delete [said].

Signed and Sealed this

Fifteenth Day of November, 1994

Attest:

BRUCE LEHMAN

*Attesting Officer*       *Commissioner of Patents and Trademarks*